(12) United States Patent
Zvi (10) Patent No.: US 8,266,691 B2
(45) Date of Patent: Sep. 11, 2012

(54) RENEWABLE INTEGRITY ROOTED SYSTEM

(75) Inventor: Nir Ben Zvi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1150 days.

(21) Appl. No.: 11/735,284

(22) Filed: Apr. 13, 2007

(65) Prior Publication Data

US 2008/0256631 A1 Oct. 16, 2008

(51) Int. Cl.
*G06F 21/24* (2006.01)

(52) U.S. Cl. ............ 726/22; 726/26; 713/165; 713/176; 713/189; 713/171

(58) Field of Classification Search .................. 726/22, 726/26; 713/165, 189, 176, 193, 171
See application file for complete search history.

(56) References Cited

U.S. PATENT DOCUMENTS

| | | | | |
|---|---|---|---|---|
| 5,802,592 | A | 9/1998 | Chess et al. ................. | 711/164 |
| 6,006,328 | A | 12/1999 | Drake ........................... | 713/200 |
| 6,105,137 | A | 8/2000 | Graunke et al. .............. | 713/201 |
| 6,477,547 | B1 * | 11/2002 | Yoshimura ................... | 1/1 |
| 6,742,177 | B1 | 5/2004 | Dorak, Jr. et al. ........... | 714/124 |
| 6,874,087 | B1 * | 3/2005 | Fetkovich et al. ............ | 726/23 |
| 6,978,375 | B1 | 12/2005 | Nusser et al. ................ | 713/187 |
| 7,055,146 | B1 | 5/2006 | Durr et al. .................... | 717/162 |
| 7,120,802 | B2 | 10/2006 | Shear et al. .................. | 713/194 |
| 2005/0076225 | A1 * | 4/2005 | Talstra et al. ................ | 713/187 |
| 2006/0107025 | A1 * | 5/2006 | Cypher ........................ | 711/216 |
| 2008/0195868 | A1 * | 8/2008 | Asokan et al. ............... | 713/176 |

OTHER PUBLICATIONS

Chen, Y. et al., "Oblivious Hashing: A Stealthy Software Integrity Verification Primitive", http:..research.microsoft.com/~yuqunc/papers/ohash.pdf, 16 pages.
Falcarin, P. et al., "Integrity Checking in Remote Computation", http://www.cs.kuleuven.be/~riccardo/uploads/docs/aica05_tflow.pdf.gz, 15 pages.
Horne, B. et al., "Dynamic Self-Checking Techniques for Improved Tamper Resistance", STAR Lab, InterTrust Technologies, http://citeseer.ist.psu.edu, 20 pages.

\* cited by examiner

*Primary Examiner* — Jeffrey Pwu
*Assistant Examiner* — Samuel Ambaye
(74) *Attorney, Agent, or Firm* — Woodcock Washburn LLP (57) ABSTRACT

A method of validating software is disclosed. The method may include receiving, at a first function, a first hash and a first version. The first function may validate a second function according to the first hash and first version. The second function may receive a second hash and a second version, and the second function may validate a third function according to the second hash and second version. The first version and first hash may be stored within the first function, for example. The first version and first hash may be stored within a manifest, for example.
In another embodiment, a method of validating software may include storing a plurality of functions and storing a version and hash for each function. Each function may be verified according to the respective version and hash, and each function may verify at least one other function.

18 Claims, 5 Drawing Sheets

```
┌─────────────────────────────────────┐
│   Storing a plurality of functions  │
│                502                  │
└─────────────────────────────────────┘
                  │
                  ▼
┌─────────────────────────────────────┐
│  Storing a version, a hash, and a   │
│         size for each function      │
│                504                  │
└─────────────────────────────────────┘
                  │
                  ▼
┌─────────────────────────────────────┐
│ Verifying each function according to│
│   the corresponding version and hash.│
│                506                  │
└─────────────────────────────────────┘

┌─────────────────────────────────────┐
│   Storing the result of each verifying│
│                508                  │
└─────────────────────────────────────┘
```

FIG. 5

RENEWABLE INTEGRITY ROOTED SYSTEM

BACKGROUND

Software systems may typically include individual binary files, each representing a portion of executable code, data, and the like. Such systems may face the malicious tampering of individual files and their respective functionality. Malicious code may be injected into one or more individual files to change, disable, or add functionality to the software. Generally known as malware, malicious code may implement spyware or computer viruses, defeat software authentication, and the like.

For example, a software system implementing an Internet browser may include a number of files. Malware may alter functions within those files, so when a user operates the now altered Internet browser, it inadvertently also operates the malicious functions.

To detect malware generally, one of two options are typically used. First, individual files may be compared with known malware signatures. Second, the integrity of the system may be checked. For example, data integrity systems that use hash functions may be able to compare files against previous versions or trusted versions of the files to detect changes.

To remove malware generally, files may be upgraded or replaced with new code not affected by the malware. After the individual compromised files have been identified, the files may be replaced or the malicious code may be removed. Also, where malicious code has not been identified, regularly replacing files with new code may reduce the impact of undetected malware.

When the malware impacts the system that is used to detect and remove the malware, the malware itself may prevent the compromised components from being replaced. For example, the malware may infect a software system and may monitor the infected file. Any attempts by the user to replace the infected file may be detected and defeated by the malware. For example, the malware may overwrite any changes or replacements the user may make, thereby preventing removal of the malicious code. As a consequence, even after the new version of the software is available to the user, the malicious code may prevent the new version from being installed. For example, while new versions of other files may be incorporated into the system, the infected file may never be updated. Furthermore, the user may go forward with the belief that the malware has been removed, while unwittingly continuing to operate the infected software.

Thus, there is a need for a software system that provides anti-tampering functionality that better detects malware and that promotes renewability of components, such that otherwise undetected malware may be identified.

SUMMARY

A method of validating software may include receiving, at a first function, a first hash and a first version. The first function may validate a second function according to the first hash and first version. The second function may receive a second hash and a second version, and the second function may validate a third function according to the second hash and second version. The first version and first hash may be stored within the first function, for example. The first version and first hash may be stored within a manifest, for example. The manifest may be cryptographically signed.

A method of validating software may include storing a plurality of functions. A version and hash for each function of the plurality of functions may also be stored. Each function may be verified according to the respective version and hash, and each function may verify at least one other function. Each function may provide an operation of a software system in addition to the verifying.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION

DETAILED DESCRIPTION

Figure 1:
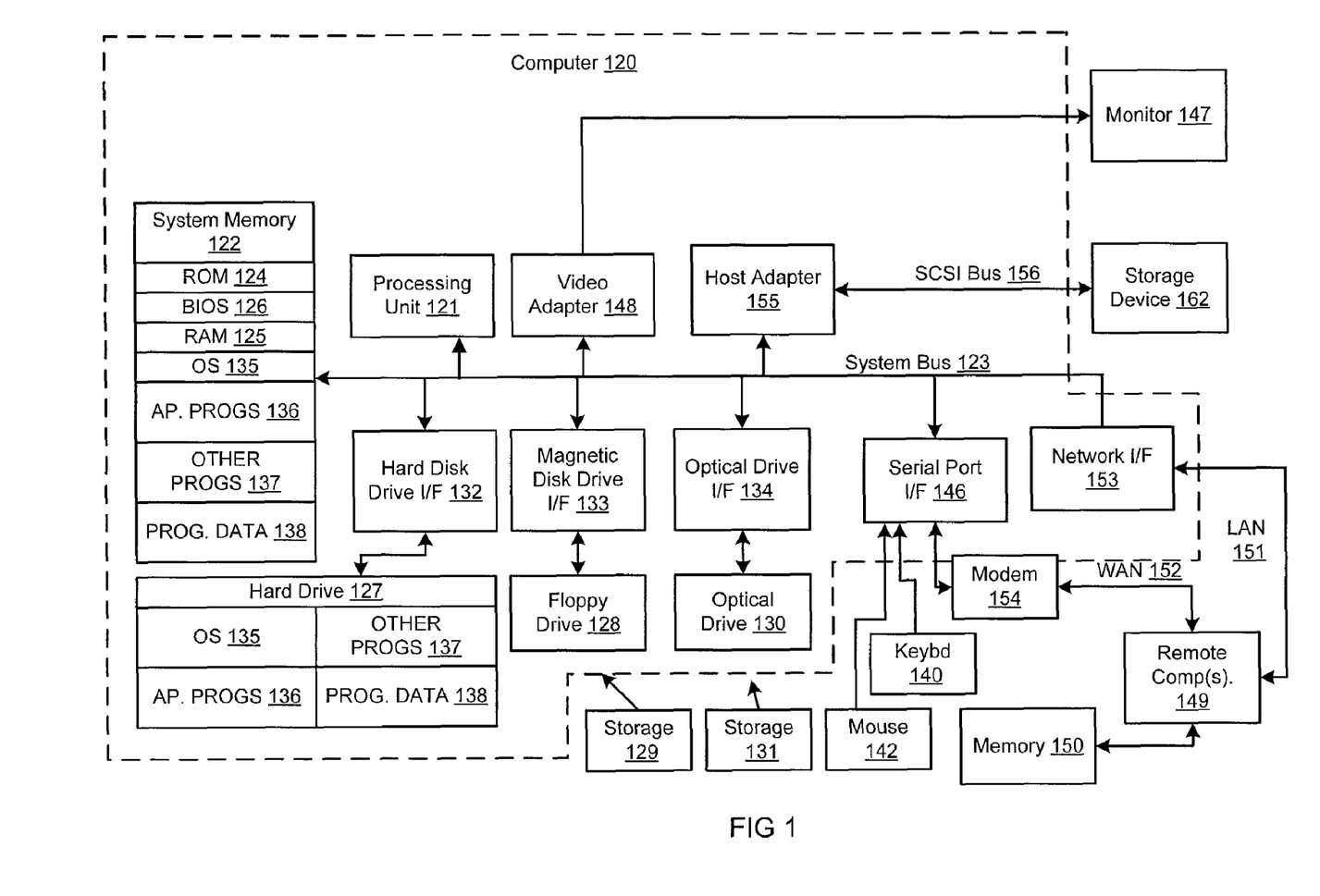
FIG. 1 depicts an exemplary operating environment.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer-readable instructions, data structures, program modules and other data for the personal computer 120.

Although the exemplary environment described herein employs a hard disk, a removable magnetic disk 129, and a removable optical disk 131, it should be appreciated that other types of computer-readable media which can store data that is accessible by a computer may also be used in the exemplary operating environment. Such other types of media include a magnetic cassette, a flash memory card, a digital video disk, a. Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a. Small. Computer. System. Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figure 2:
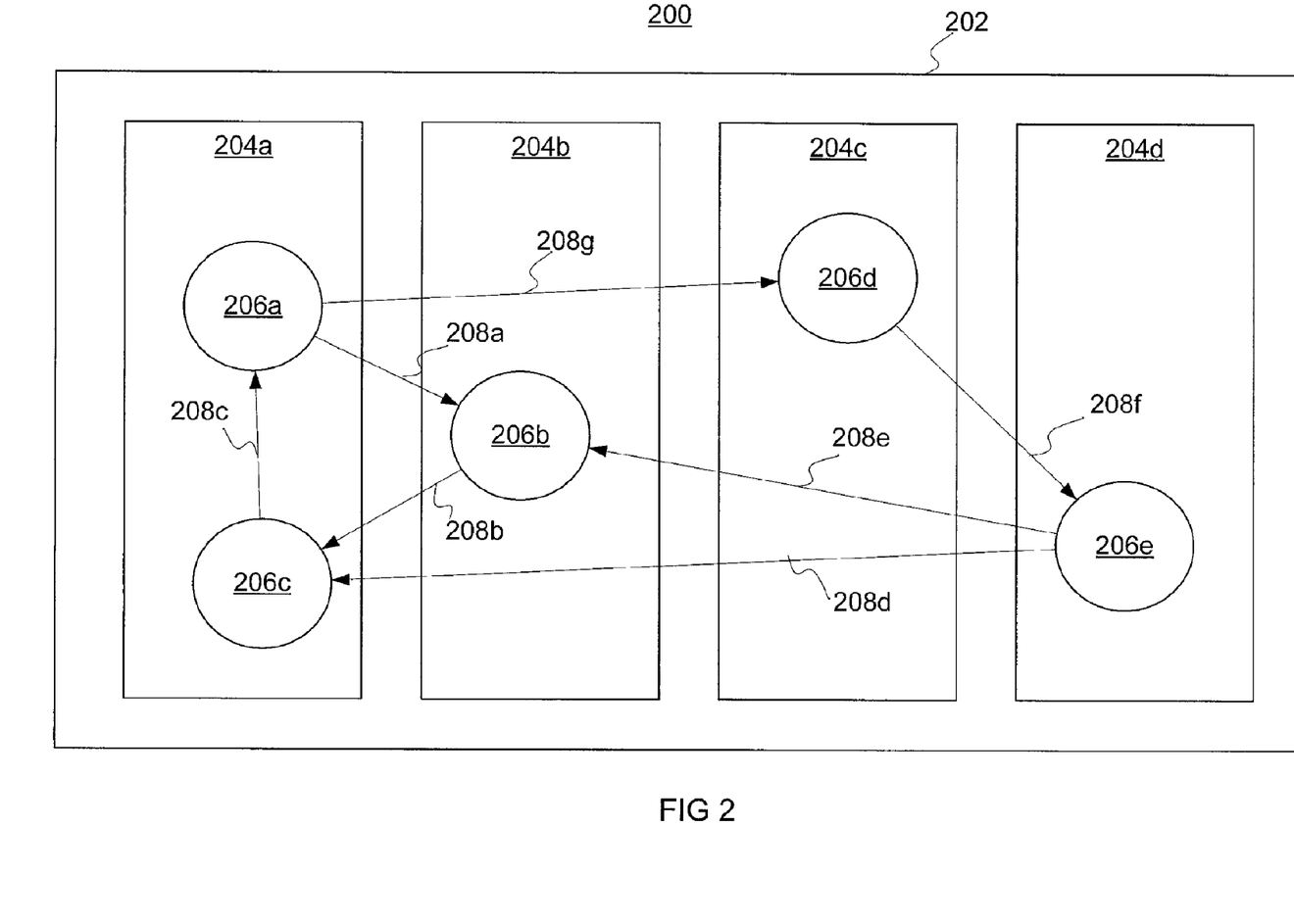
FIG. 2 depicts an exemplary renewable anti-tampering system.

FIG. 2 depicts an exemplary renewable anti-tampering system 200. The anti-tampering system 200 may be implemented in connection with a software system 202. The software system 202 may be any application, program, product, and the like. For example, the software system 202 may be an operating system, an Internet browser, productivity software, media software, networking and database applications, and the like. The software system 202 may be any combination of these as well. The software system may include one or more binary files 204ad.

Each binary file 204ad may contain data and functions pertinent to the software system 202. For example, the binary file 204ad may contain machine executable code, application data, user data, and the like. Each binary file 204ad may represent some functionality that the software system 202 provides. Each binary file 204ad may be accessible to the computer 120 on which the software system 202 runs. For example, each binary file 204ad may reside in RAM 125, hard drive 127, floppy drive 128, optical drive 130, or storage device 162 in communication with the computer 120. In one embodiment, the binary files 204ad may be stored on the hard drive 127 with following extensions ".exe," ".dll," ".sys," for example.

Each binary file 204ad may include one or more functions 206ae. Each function 206ae may represent a particular aspect or functionality associated with the software system 202. For example, each function 206ae may be a portion of code that performs a specific task. Each function 206ae may be implemented as a method, procedure, subprogram, subroutine, and the like. In one embodiment, the functions 206ae may be part of objects within an object oriented programming environment.

Each function 206ae may provide functionality to the running software system when called. Each function 206ae may be called by itself, another function 206ae within the same software system 202, or a function (not shown) in another software system (not shown). When called, a function 206ae may cause specific executable code to be processed. The function 206ae may be passed parameters from the calling function, and at the conclusion of the function's specific task, the function 206ae may return a value to the calling function.

Within the software system 202, there may be thousands of functions 206ae. Some or all of the functions 206ae may be selected to implement the anti-tampering system 200. Those functions 206ae selected may be included within binary files 204ad. Some binary files 204ad may include more than one of the functions 206ae selected to implement the anti-tampering system 200. The functions 206ae that are selected to implement the anti-tampering system 200 may provide important or commonly used functionality within the software system 202. Such a selection may increase the frequency with which the functions 206ae are called.

For example, an illustrative software system 202 may include 21,000 functions 206ae, 500 functions 206ae may relate to important and commonly used functionality of the software system, and of the 500 functions 206ae, 100 functions 206ae may be selected to implement the anti-tampering system 200. The 100 functions 206ae may be stored in binary files 204ad within the software system 202.

Regarding the functions 206ae selected to implement the anti-tampering system 200, each function 206ae may validate another function 206ae, and each function 206ae may be validated by another function 206ae. The system or network of functions 206ae each validating each other may be closed. In one embodiment, a function 206ae may validate more than one other function 206ae. For example, referring to FIG. 2, function 206e may validate function 206c in a binary file 204a and function 206b in a binary file 204b. In one embodiment, a function 206ae may be validated by more than one function 206*ae*. For example, again referring to FIG. 2, function 206*b* may be validated by 206*a* and validated by function 206*e*.

A function call 208*ag* may be made when a function 206*ae* validates another function 206*ae*. The function call 208*ag* may define a source and a target. For example, the function 206*ae* being validated may be the target of the function call 208*ag* and the function 206*ae* validating may be the source of the function call 208*ag*. Each function 206*ae* selected to implement an anti-tampering system 200 may be at least one source and one target of the function calls 208*ag* within the anti-tampering system 200.

The functions 206*ae* may be included throughout the software system 202 and incorporated such that when key functionality is executed by the user a function 206*ae* that validates another function 206*ae* may be called. For example, in word processing program, the function 206*ae* that displays a dialog box when opening a document may call a function 206*ae* that validates another function 206*ae*.

After a function 206*ae* has been validated and the result is acceptable, the software system 202 may resume operating at the point at which the function 206*ae* was validated. If the result is not acceptable, the function 206*ae* may have been compromised and a response action may be processed. For example, the response action may limit functionality of the software system 202, indicate the detection of the validation failure to a user, or halt the computer 120. The processing of the response action may depend from the nature and extent that the result of the validation is not acceptable.

Validating a function 206*ae* may include checking whether function has not been altered and whether a proper version of the function 206*ae* is in place. In one embodiment, validating a function 206*ae* may include comparing the function 206*ae* to a trusted copy of the function 206*ae*. In one embodiment, validating a function 206*ae* may include comparing a version (see FIG. 3) of the function against a trusted version (see FIG. 3). Checking the version (see FIG. 3) of the function may ensure that functions are kept up-to-date with the latest released versions.

Figure 3:
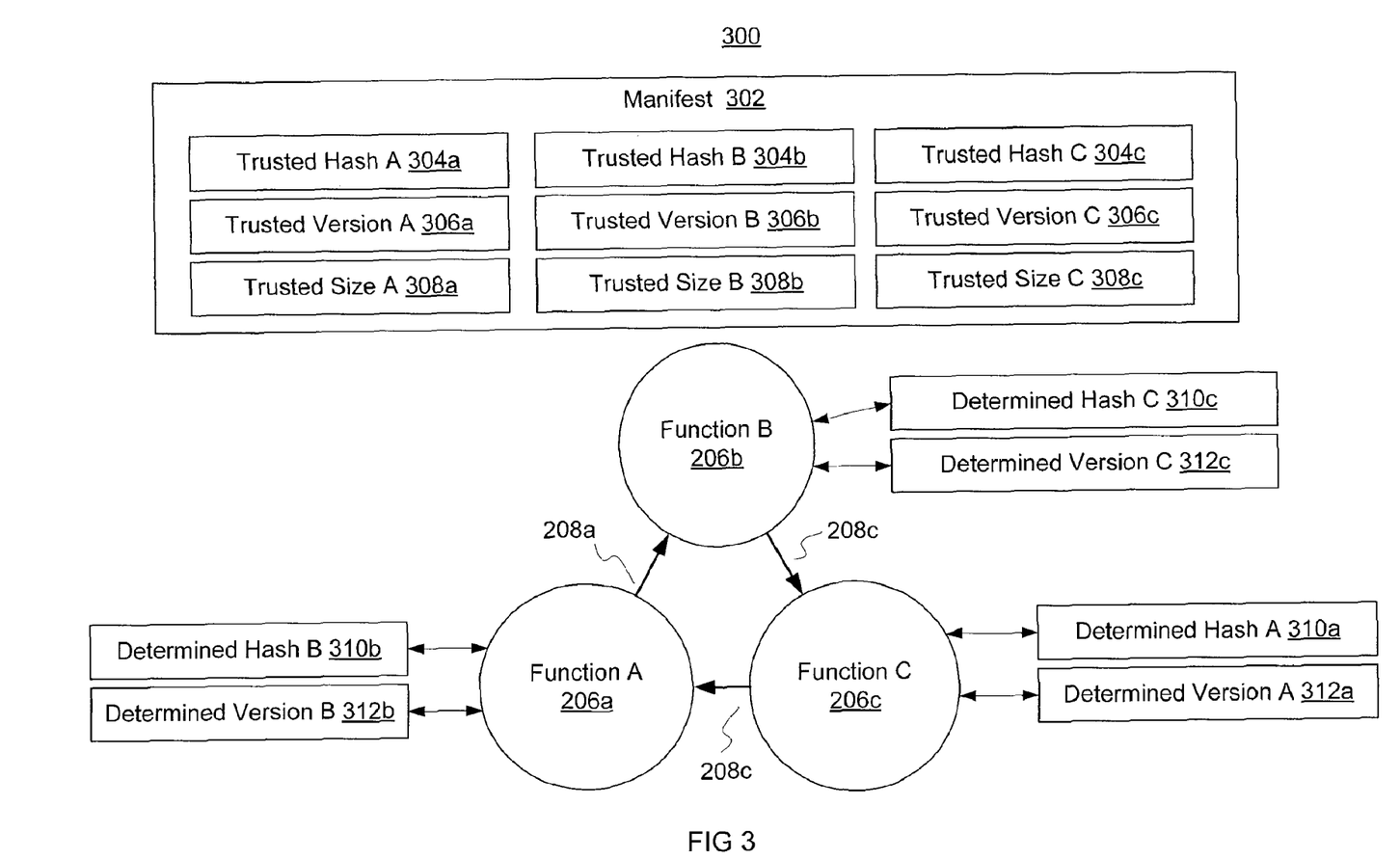
FIG. 3 illustrates an exemplary closed network of anti-tampering functions.

FIG. 3 depicts an exemplary renewable anti-tampering system 300. A trusted hash 304*ac*, a trusted version 306*ac*, and a trusted size 308*ac* for each function 206*ac* may be stored in the anti-tampering system 300. For example, the trusted hash 304*ac*, trusted version 306*ac*, and trusted size 308*ac* may be stored in a manifest 302. The manifest 302 may be cryptographically signed. For example, using an asymmetric cryptography scheme, the manifest 302 may be signed to provide authentication. The asymmetric cryptography scheme may include public-private key cryptography, public key infrastructure, digital identity certificates, and the like. For example, the manifest 302 may be digitally signed by a root certificate. In one embodiment, the manifest 302 may be accessible to the processing unit 121 as a data file on the hard drive 127. In one embodiment, the manifest 302 may be stored on a remote computer 149. In one embodiment, trusted hash 304*ac*, trusted version 306*ac*, and trusted size 308*ac* may be stored within a function 206*ac*.

The trusted hash 304*ac* may include the data resulting from processing a function 206*ac* as input to a hash function. For example, a function 206*ac* may be identified by its starting byte and its size within a binary file 204*ad*. The starting byte may include a trusted offset. The size may be the trusted size 308*ac*. This portion of the binary file 204*ad* may be input to a hash function. In one embodiment, a portion of system memory corresponding to the binary file 204*ad* may be input to a hash function. The hash function may be a cryptographic hash function that is pre-image resistant, such that it would be difficult to find two different inputs where the hash of each input is equal. For example, the following hash functions may be used to create a trusted hash 304*ac* of the function 206*ac*: HAVAL, MD2, MD4, MD5, PANAMA, RIPEMD, SHA-0, SHA-1, SHA-256/224, SHA-512/384, Tiger(2)-192/160/128, VEST-4/8, VEST-16/32.

The trusted version 306*ac* associated with a function 206*ac* may include a version that is acceptable within the software system 202. The trusted version 306*ac* may be any data indicative of the identity of a particular function 206*ac*. For example, the trusted version 206*ac* may represent a range of version numbers such that the software system 202 may accept any corresponding function 206*ac* with a version within that range.

The trusted size 308*ac* associated with a function 206*ac* may include data indicative of the number of bits used to represent the function 206*ac*. For example, the trusted size 308*ac* may include a number of bytes of the binary file 204*ad* that reflects the operation of the function 206*ac*. The trusted size 308*ac* may be used when processing the determined hash 310*ac* of a function.

Within the anti-tampering system 300, each function 206*ac* may validate at least one other function 206*ac* and each function 206*ac* may be validated by at least one other function 206*ac*. For example, referring to a FIG. 3, Function A 206*a* may validate. Function B 206*b* and may be validated by Function C 206*c*. When a function 206*ac* validates another function 206*ac*, a determined hash 310*ac* and determined version 312*ac* may be compared to the corresponding trusted hash 304*ac* and trusted version 306*ac*. In one embodiment, the trusted hash 304*ac* may be compared first and the trusted version 306*ac* may be compared second.

The determined hash 310*ac* may be calculated by identifying the function 206*ac* and processing the function 206*ac* as input to a hash function. The function 206*ac* may be identified within the binary file 204*ad* as a collection of bits equal in number to the corresponding trusted size 308*ac* and measured from the start byte of the function 206*ac*. The start byte of the function 206*ac* may be the point within the binary file 204*ad* or system memory which is processed when the function 206*ac* is called.

The determined version 312*ac* may be calculated such that it identifies the function 206*ac*. In one embodiment, the determined version 312*ac* may be represented by the function 206*ac* itself. For example, the function 206*ac* may return a version number when called. For example, the determined version 312*ac* may be hard-coded as part of the function 206*ac* itself.

In one embodiment, the determined version 312*ac* may be calculated from the determined hash 304*ac*. In such an embodiment, the manifest 302 may include multiple trusted hashes 304*ac* for each function 206*ac*. Each of the multiple trusted hashes 304*ac* may represent an individual version of the function. The determined hash 310*ac* may be compared against each of the multiple trusted hashes 304*ac*, thus validating the determined hash 310*ac* and determined version 310*ac* concurrently.

Figure 4:
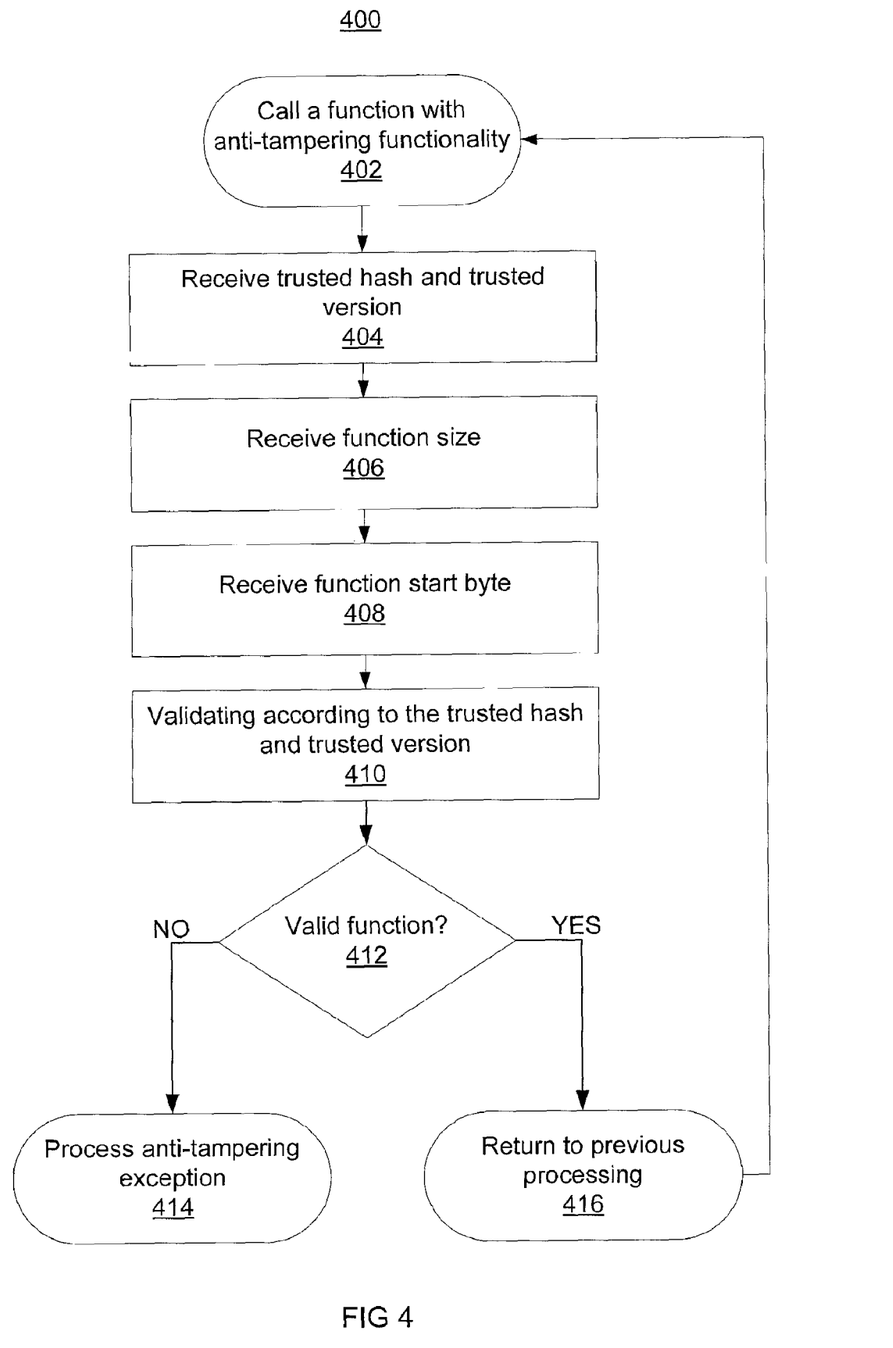
FIG. 4 is a flow diagram illustrating an exemplary anti-tampering process.

FIG. 4 depicts a flow diagram illustrative of an exemplary anti-tampering process 400. At 402, a first function 206*ac* may be called at some point during the operation of the software system 202. When the first function 206*ac* is called, it may provide functionality related to the operation of the software system 202 and may validate a second function 206*ac*.

At 404, the first function 206*ac* may receive a first hash 304*ac* and a first version 306*ac*. The first hash 304*ac* and first version 306*ac* may correspond to a second function 206*ac* that the first function 206*ac* may validate. The first hash 304ac and first version 306ac may be stored within the first function 206ac. For example, the first hash 304ac and first version 306ac may be hard-coded within the operation of the first function 206ac. In another embodiment, the first hash 304ac and first version 306ac may be stored in a manifest 302.

At 406, the first function 206ac may receive a first size 308ac. The first size 308ac may correspond to the number of bits associated with the second function 206ac. In one embodiment, the first size 308ac may be hard coded within the first function 206ac. In another embodiment, the first size 308ac may be stored within a manifest 302.

At 408, the first function 206ac may receive the start byte of the second function 206ac. In one embodiment, the start byte of the second function 206ac may include a memory address. For example, where the second function 206ac is stored in RAM 125, the memory address may include a pointer to the first byte indicating where the function 206ac is stored. In one embodiment, the start byte of the second function 206ac may also include an offset. For example, where the second function is stored in a binary file 204ad, the offset may describe the number of bits between the start of the binary file 204ad in the beginning of the second function 206ac.

At 410, the first function 206ac may validate the second function 206ac according to the first hash 304ac and the first version 304ac. In one embodiment, the second function 206ac may be hashed according to a hash function and the output of the hash function may be compared to the first hash 304ac. For example, the second function 206ac may be hashed by providing the data corresponding to the first size beginning at the start byte of the function as input to a hash function.

The first function 206ac may validate the second function 206ac according to the first version 306ac by comparing the received first version 206ac with that of the second function 206ac. For example, where the first version 306ac includes a range, comparing the received first version 306ac with that of the second function may include determining whether the determined version 312ac of the second function 206ac is within the range associated with the first version 306ac.

At 412, a subsequent action may be taken responsive the validation at 410. For example, if the function 206ac is validated as inconsistent with the first hash 304ac and first version 304ac, the function 206ac may have been compromised by malware or may not have been properly updated. At 414, an exception may be processed. In one embodiment, the exception may cause the software system 202 to crash or hang, indicating to the user that there is a potential malware problem. In addition, halting the software system may prevent the malware from spreading to other computers in a network environment. In one embodiment, a message may be displayed to the user. In one embodiment, the exception may be logged for later inspection. In one embodiment, functionality related to the software system 202 may be impaired or limited until the exception may be resolved and the function may be later properly validated.

Again at 412, if the function 206ac is validated as consistent with the first hash 304ac and first version 306ac, the function 206ac may be presumed free of malware. At 416, the software system 202 may resume processing at the point in which the first function 206ac was called.

Given the plurality of functions 206ac with anti-tampering functionality, the process may repeat when a third function 206ac may be called that may validate the first function 206ac. In a closed network of functions 206ac, each function 206ac may validate another function and each function 206ac may be validated by another function 206ac.

Figure 5:
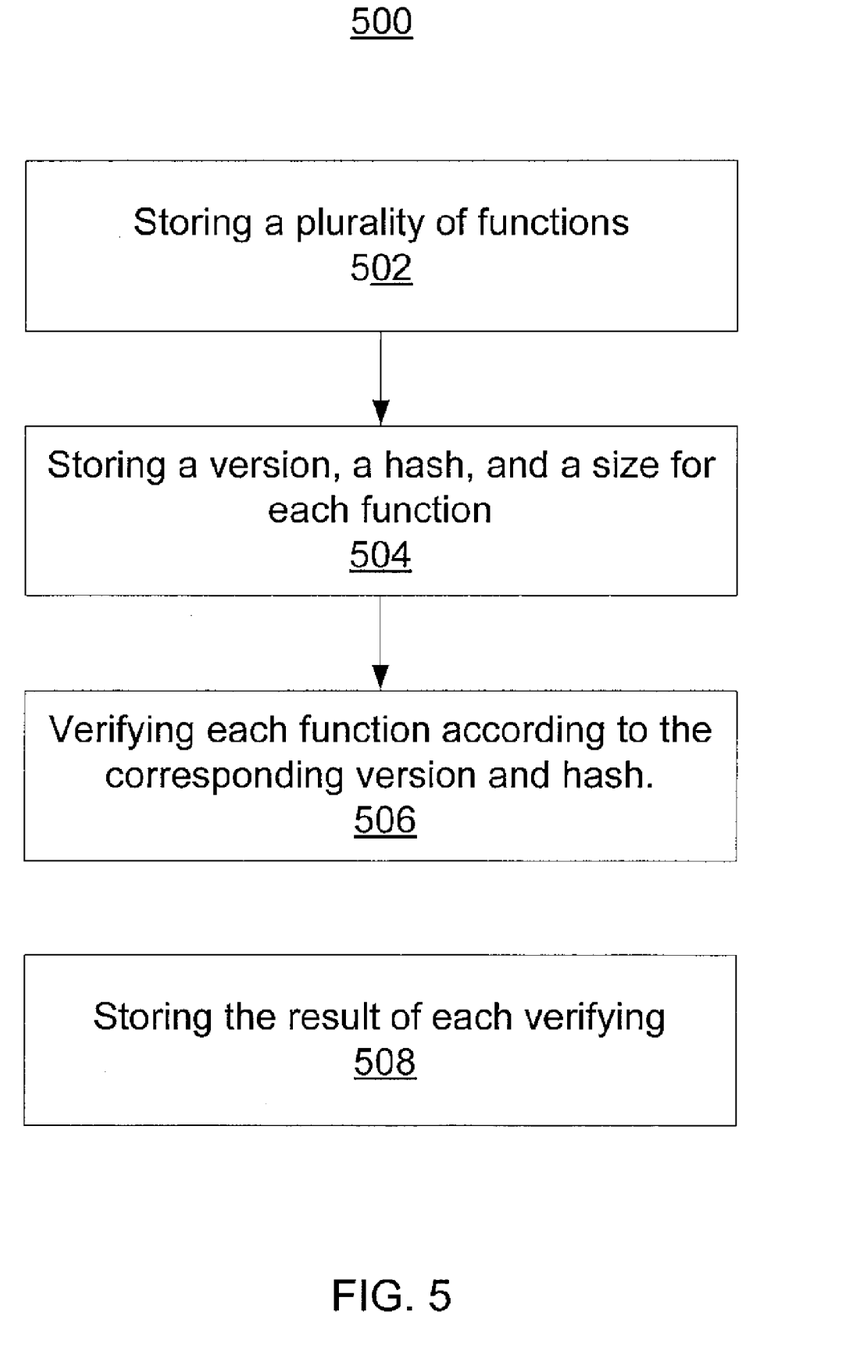
FIG. 5 is a flow diagram illustrative an exemplary anti-tampering process.

FIG. 5 depicts a flow diagram illustrating an exemplary anti-tampering process 500. In the anti-tampering system 300, at 502, a plurality of functions 206ac may be stored. The plurality of functions 206ac may be stored within the context of the software system 202. Each function 206ac may include anti-tampering or verification functionality for example.

In one embodiment, each function 206ac or a subset of the plurality of functions may include functionality that provides an operation of the software system 202 in addition to the anti-tampering or verifying functionality. For example, each function 206ac may provide functionality critical to the operation of the software system 202, such that removal of the function may disrupt operation of the software system 202.

Each function 206ac may be stored in its own binary file 204ad, for example. In one embodiment, more than one function 206ac may be stored in a given binary file 204ad. The binary files 204ad may constitute component parts of a software system 202, for example. The binary files 204ad may be stored in a computer-readable medium such as a hard disk, CD-ROM, DVD-ROM, flash drive, or the like.

At 504, a version 306ac, hash 304ac, and size 308ac may be stored for each function 206ac. The version 306ac, hash 304ac, and size 308ac may be stored in any manner that associates it with function 206ac. For example the version 306ac, hash 304ac, and size 308ac may be hard-coded within a function 206ac. In one embodiment, the version 306ac, hash 304ac, and size 308ac may be stored in a manifest 302. The manifest 302 may be cryptographically signed. In one embodiment, the version 306ac, hash 304ac, and size 308ac may be stored in a hardware key or other off-line storage. For example, the manifest 302 may be stored remotely, such as on a different computing device, authentication server, Web server, and the like.

At 506, each function 206ac may be verified according to the corresponding version 306ac and hash 304ac, and each function 206ac may verify another function 206ac by corresponding version 306ac and hash 304ac. The verification may include determining the hash 310ac and version 312ac of the function 206ac to be verified and comparing the determined hash 310ac and version 312ac with the stored trusted hash 304ac and version 306ac. The functions 206ac may verify each other via a software process as defined by the functions or via a hardware process. The hardware process may include an interrupt handler function in which the processing unit 121 verifies according to the hash 304ac and version 306ac. The processing unit 121 may parse the manifest 302 and may include a trust model to trust a digital signature associated with the manifest 302.

At 508, the result of each verifying may be stored. For example, the result may be stored to a log file that may be later inspected. Storing each verification may provide forensics data useful for studying a malware attack. Also, storing each verification may provide performance data which may show increased resiliency of the anti-tampering system 500.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-volatile computer-readable storage medium for validating software, wherein the storage medium is not a signal, the computer-readable storage medium including computer executable instructions to perform acts comprising:

receiving, at a first function, a first hash, a first size and a first version;

validating, by the first function, a second function according to the first hash, the first size and the first version at least in part by using the first function to hash the second function according to a hash function and comparing a first output of the hash function to the first hash;

receiving, at the second function, a second hash and a second version; and validating, by the second function, a third function that is different than the first function according to the second hash and second version at least in part by using the second function to hash the third function according to the hash function and comparing a second output of the hash function to the second hash.

2. The computer-readable storage medium of claim 1, wherein the first function provides an operation of the software.

3. The computer-readable storage medium of claim 1, wherein the first hash and first version are stored within the first function.

4. The computer-readable storage medium of claim 1, wherein the first version and the first hash are stored in a manifest.

5. The computer-readable storage medium of claim 4, wherein the manifest is cryptographically signed.

6. The computer-readable storage medium of claim 1, wherein the first version comprises a range of version numbers.

7. The computer-readable storage medium of claim 1, further comprising receiving a starting point wherein the second function may be defined by the starting point and the first size.

8. The computer-readable storage medium of claim 1, wherein the first function and the second function are stored within a binary file.

9. A method of validating software, comprising:
storing a plurality of functions;
storing a respective start byte, size, version and hash for each function of the plurality of functions; and
verifying each function according to the respective version and the hash, wherein a first function verifies a second function at least in part by hashing the second function according to a hash function and comparing a first output of the hash function to a first stored hash and the second function verifies a third function that is different than the first function at least in part by hashing the third function according to the hash function and comparing a second output of the hash function to a second stored hash, each function of the plurality of functions verifying another function of the plurality of functions according to the respective version and the hash.

10. The method of claim 9, wherein the each function of the plurality of functions provides an operation of the software in addition to said validating.

11. The method of claim 9, wherein each respective hash and version are stored within the each respective function of the plurality of functions.

12. The method of claim 9, wherein each respective version and hash are stored in a manifest.

13. The method of claim 12, wherein the manifest is cryptographically signed.

14. The method of claim 9, wherein the first version comprises a range of version numbers.

15. The method of claim 9, where at least two functions of the plurality of functions are stored within the same binary file.

16. A system for validating software, the system comprising:
a processor that processes a plurality of function calls, each function call being processed according to a respective source function and verifying a respective target function according to a respective version and respective hash at least in part by hashing the respective target function according to a hash function and comparing an output of the hash function to the respective hash, wherein the target function is different than the source function; and
a memory unit that stores a plurality of functions and that stores the respective version and respective hash for each function of the plurality of functions, wherein each function of the plurality of functions is defined as a respective source function that verifies another function of the plurality of functions and a respective target function of a function call made when the respective target function is being verified.

17. The system of claim 16, wherein the respective version and the respective hash are stored in a manifest.

18. The system of claim 17, wherein the manifest is cryptographically signed.

* * * * *